(12) United States Patent
Yoshizawa et al.

(10) Patent No.: US 7,378,192 B2
(45) Date of Patent: May 27, 2008

(54) NONAQUEOUS ELECTROLYTE BATTERY

(75) Inventors: Hiroshi Yoshizawa, Osaka (JP);
Takayuki Shirane, Osaka (JP);
Yoshiaki Nitta, Osaka (JP); Kazuhiro Okamura, Osaka (JP)

(73) Assignee: Matsushita Electric Industrial Co., Ltd.

( * ) Notice: Subject to any disclaimer, the term of this patent is extended or adjusted under 35 U.S.C. 154(b) by 1039 days.

(21) Appl. No.: 10/194,032

(22) Filed: Jul. 12, 2002

(65) Prior Publication Data

US 2002/0192551 A1 Dec. 19, 2002

Related U.S. Application Data

(62) Division of application No. 09/699,636, filed on Oct. 30, 2000, now Pat. No. 6,440,606.

(30) Foreign Application Priority Data

Oct. 29, 1999 (JP) ............................ 11-309306
Dec. 14, 1999 (JP) ............................ 11-354328

(51) Int. Cl.
*H01M 4/58* (2006.01)
(52) U.S. Cl. ............... 429/231.95; 429/322; 429/221; 429/231.9
(58) Field of Classification Search ........... 429/221, 429/231.1, 218.1, 322, 231.95; 423/599
See application file for complete search history.

(56) References Cited

U.S. PATENT DOCUMENTS 5,910,382 A * 6/1999 Goodenough et al. ... 429/218.1
6,140,001 A * 10/2000 Miyaji et al. ............ 430/106.2
6,607,706 B1 * 8/2003 Kumar et al. ............ 423/599
6,749,648 B1 * 6/2004 Kumar et al. ............ 29/623.1
2003/0203205 A1 * 10/2003 Bi et al. .................... 428/402

OTHER PUBLICATIONS

Zhen et al., "A new process for preparing nanosize ceramic powders", Materials Research Society Symposium Proceedings (1994) 351 425-30.*

* cited by examiner

*Primary Examiner*—Patrick Ryan
*Assistant Examiner*—Ben Lewis
(74) *Attorney, Agent, or Firm*—RatnerPrestia

(57) ABSTRACT

To present a nonaqueous electrolyte secondary battery using iron compound which is inexpensive and abundant in resource, as the active material for the positive electrode. An iron compound with particle size of 1 to 300 nm or less, being composed of substantially spherical primary particles of pore-free matter, is used as the active material for a positive electrode, which is used together with a negative electrode and a nonaqueous electrolyte for composing the battery. By forming the primary particles for composing particles of the iron compound as a pore-free matter, being controlled in a range of 1 to 300 nm, nano effects are brought about, and it is also effective to suppress excessive increase of surface area which may lead to promotion of decomposition of electrolyte, and an excellent discharge capacity is realized stably for a long period.

17 Claims, 1 Drawing Sheet

NONAQUEOUS ELECTROLYTE BATTERY

This application is a divisional application of U.S. application Ser. No. 09/699,636, filed Oct. 30, 2000 now U.S. Pat. No. 6,440,606, allowed May 9, 2002, incorporated herein by reference.

BACKGROUND OF THE INVENTION

The present invention relates to a nonaqueous electrolyte battery using an iron compound as an active material for positive electrode, and more particularly it is intended to realize a stable nonaqueous electrolyte battery of high energy density utilizing iron which is abundant in resource and inexpensive, by forming iron compound powder as nano particles in an appropriate particle size range composed of primary particles of pore-free matter.

Recently, in the cordless and portable trend of electronic appliances such as audio and video apparatuses and personal computers, lithium secondary batteries of high energy density using nonaqueous electrolyte come to be employed widely. In these practical nonaqueous electrolyte lithium secondary batteries, a composite compound of much lithium and transition metal is used as the positive electrode active material. In particular, $LiCoO_2$ is regarded as one of the important materials presenting a high operating voltage of 4 V class stably.

However, cobalt is a precious resource and the material cost becomes high, and an inexpensive positive electrode active material of high performance capable of replacing $LiCoO_2$ has been demanded. From this point of view, the iron compound mainly composed of profuse and cheap iron has been one of important research objects. Regrettably, many problems are left unsolved, and it is not put in practical use at the present.

First, the iron compound has been questioned about possibility of basic electrochemical reactions such as operating voltage and discharge capacity. For example, as reported in Battery Discussion Papers 1995, pp. 23-24, $LiFeO_2$ having zigzag layer structure was synthesized, and a nonaqueous electrolyte battery was fabricated by using it as the positive electrode, and its operation as a battery was confirmed. In this case, the discharge voltage was 2 V, and unlike the battery using $LiCoO_2$ as the positive electrode, operation of 4 V class not observed.

B. Fuchs et al. reported that $LiFeO_2$ of layer structure similar to that of $LiCoO_2$, instead of zigzag layer structure, was synthesized (Solid State Ionics, 68, 1994, p. 279). Their report, however, did not include the action of the obtained $LiFeO_2$ as positive electrode active material, that is, operation of insertion and desorption of lithium.

Japanese Laid-open Patent No. 8-78019 discloses a nonaqueous electrolyte battery using iron oxide containing lithium expressed in the formula $Li_xFeO_y$, (0<x 1.5, 1.8<y<2.2) as the positive electrode. Herein, the specific surface area of the iron oxide was measured by the BET method, and a preferable surface area was presented in a range of 0.5 to 20.5 $m^2/g$. The battery obtained in the preferred condition operated in a 4 V region, and the discharge capacity per unit weight was 110 to 130 mAh/g. It is also disclosed that the preferable specific surface area range was obtained by selecting the particle size in a range of 0.4 to 20.5 $m^2/g$. However, as mentioned in the patent publication, as the specific surface area increases, in the iron compound, the iron oxide containing lithium and electrolyte solution react, and the electrolyte solution is decomposed. Actually, the battery using the iron oxide having such large specific surface area presents a large discharge capacity per unit weight in the first cycle, but suddenly and substantially drops in the capacity after the second cycle, and the stability was very poor as the positive electrode active material for secondary battery.

On the other hand, it has been attempted to pulverize the active material further into a region of nano particles and increase the discharge capacity per unit weight of active material. For example, U.S. Pat. No. 5,569,561 discloses a technology of using oxides in nano particle form in a size of 1 to 250 nm, such as $TiO_2$, $Nb_2O_5$, $HfO_2$, $MnO_2$, $Li_yNiO_2$, $Li_yCoO_2$, $Li_y(NiCo)O_2$, and $LiMn_2O_4$, as active material. In this United States patent, a battery using titanium oxide as the active material for negative electrode is disclosed, and the preferred particle size of this titanium oxide is specified to be in a range 1 to 300 nm. Although it is disclosed that the capacity is increased by using particles in a nano region, nothing specific is mentioned about the iron compound particles.

Separately, Japanese Laid-open Patent No. 9-82312 discloses a nonaqueous electrolyte battery using transition metal oxide or sulfide containing lithium composed of primary particles with particle size of 0.5 μm or less as the positive electrode active material. Nothing specific is mentioned about iron compound in this patent publication, but iron compound is included in the group of oxide and sulfide containing lithium, and a range of 5 nm to 200 nm is given as preferred particle size, and the range of preferred specific surface area is 100 $m^2/g$ or more. As disclosed also in this publication, the positive electrode active material powder has a peak of pore distribution at radius of 50 nm or less, and a section of a primary particle of porous matter is illustrated.

As explained in Japanese Laid-open Patent No. 8-78019, although it is affirmatively known that the initial capacity is heightened by pulverizing the active material and increasing the specific surface area, if using the iron oxide containing lithium as positive electrode active material, the electrolyte solution is decomposed when the specific surface area exceeds 100 $m^2/g$, thereby producing a contradictory result of disturbance of stability of characteristic. That is, by nano pulverization, particles increase in the region inducing such problems.

These prior arts may be summed up as follows. That is, by synthesizing a layer structure similar to $LiCoO_2$, and selecting a region of large specific surface area in a fine nano particle region, it was once considered possible to apply the iron compound in the active material for nonaqueous electrolyte battery of 4 V class. Actually, however, the specific surface area increases by nano pulverization, and there is a risk of inducing a serious problem for iron compound such as decomposition of nonaqueous electrolyte. From the viewpoint of realizing a stable secondary battery of high capacity by applying the iron compound as the active material, it seemed necessary to develop a new particle control technology that cannot be controlled by the nano pulverization of particles alone. In other words, it is a new and vital issue for using iron compound as nonaqueous electrolyte secondary battery to solve simultaneously two contradictory problems, that is, to heighten the capacity by using nano particles, and to avoid decomposition of electrolyte solution due to pulverization of particles.

SUMMARY OF THE INVENTION

The invention unveils specific aspects for solving the above problems.

A first aspect of the invention presents a nonaqueous electrolyte secondary battery comprising a positive electrode, a negative electrode, and a nonaqueous electrolyte, in which the positive electrode active material is substantially an iron compound of nano particles of 1 to 300 nm or less composed of primary particles of pore-free matter.

A second aspect relates to the nonaqueous electrolyte secondary battery of the first aspect, in which the iron compound is at least one type selected from the group consisting of iron oxide, phosphorus oxide, and halide.

A third aspect relates to the nonaqueous electrolyte secondary battery of the first or second aspect, in which the iron compound contains lithium.

A fourth aspect relates to the nonaqueous electrolyte secondary battery of any one of the first to third aspects, in which the specific surface area of the iron compound is 100 m$^2$/g or less.

A fifth aspect relates to the nonaqueous electrolyte secondary battery of any one of the first to fourth aspects, in which the composition of the iron compound is $Li_xFeO_y$, ($0<x\leq1.5$, $1.8<y<2.2$).

In the first aspect of the invention, by using the iron compound of which primary particles is substantially a pore-free matter in nano particle region, occlusion and release of lithium in the 4 V region, which were hitherto difficult, are easy, and a stable charging or discharging is possible. When particles are in nano particle region, the number of constituent atoms in particle is extremely small, and band structure is hardly formed, so that the energy level of electrons becomes discrete. As a result, electrons can be given and taken relatively easily, so that occlusion and release of lithium ions seem to be improved.

Besides, the form of particles in which the primary particles are substantially pore-free matter gives continuity of crystals inside the crystals, and helps smooth diffusion of Li ions inside the crystals. Undulated structure of particle surface impedes convection of electrolyte bulk, and causes energy concentration at leading ends of undulation, possibly leading to decomposition of electrolyte solution, and hence such structure should be avoided as far as possible.

Although the iron compound particles of the invention are nano particles, there are secondary particles and tertiary particles gathering plural primary particles. However, the effect of the invention is achieved at least when the primary particles are substantially pore-free matter. The state of pore-free matter means a smooth particle surface state less in undulation, being free from fine pores as found in the porous material. Also considering the performance of filling the electrode with active material, particles are preferred to be spherical.

As shown in the second aspect, the form of iron compound as the foundation of the compound for composing the positive electrode brings about the effect as shown in the first aspect on the material which is at least one type selected from the group consisting of oxide, phosphorus oxide and halide. Such compound includes a compound containing lithium. In the positive electrode, lithium ions are occluded in the crystals by discharging, and desorbed by charging. That is, the iron compound of active material for the positive electrode includes an intermediate form expressed as a composite compound occluding lithium partially, between a form of the compound occluding lithium and a form of compound not occluding lithium. The iron compound composing the positive electrode of the invention may be also composed by a compound not containing lithium, but including such intermediate compound, the form of compound including lithium can be also applied.

In the third aspect, the range of the specific surface area of 100 m$^2$/g or less shows the control range for suppressing decomposition of nonaqueous electrolyte. As explained in the first aspect of the invention, when the iron compound of porous surface and a large surface activity contacts with a nonaqueous electrolyte, the electrolyte is decomposed. The risk of occurrence of such inconvenience increases as the particles of the iron compound are pulverized to nano particles and the specific surface area increases. It is generally difficult to control within such specific surface area in the nano particle region composed of primary particles of porous matter. In this invention, since the particles are composed of primary particles of pore-free matter substantially on the surface, excessive increase of specific surface area can be suppressed even in nano particle region.

From other point of view, this range of specific surface area is regarded as an index for controlling to confirm that the nano particles are substantially formed of primary particles of pore-free matter, being low in the risk of decomposing the electrolyte.

In the fourth aspect of the invention, the compound expressed as $Li_xFeO_y$, ($0<x$ 1.5, $1.8<y<2.2$) is a iron compound containing lithium having a marked effect for applying the invention.

As described herein, the invention presents a nonaqueous electrolyte secondary battery of large capacity and excellent stability, using an inexpensive iron compound as the positive electrode active material, by comprising a positive electrode, a negative electrode, and a nonaqueous electrolyte, in which the positive electrode active material is an iron compound of which particle size is 1 to 300 nm or less, and primary particles for composing it are substantially pore-free matter.

DETAILED DESCRIPTION OF THE PREFERRED EMBODIMENT

Figure 1:
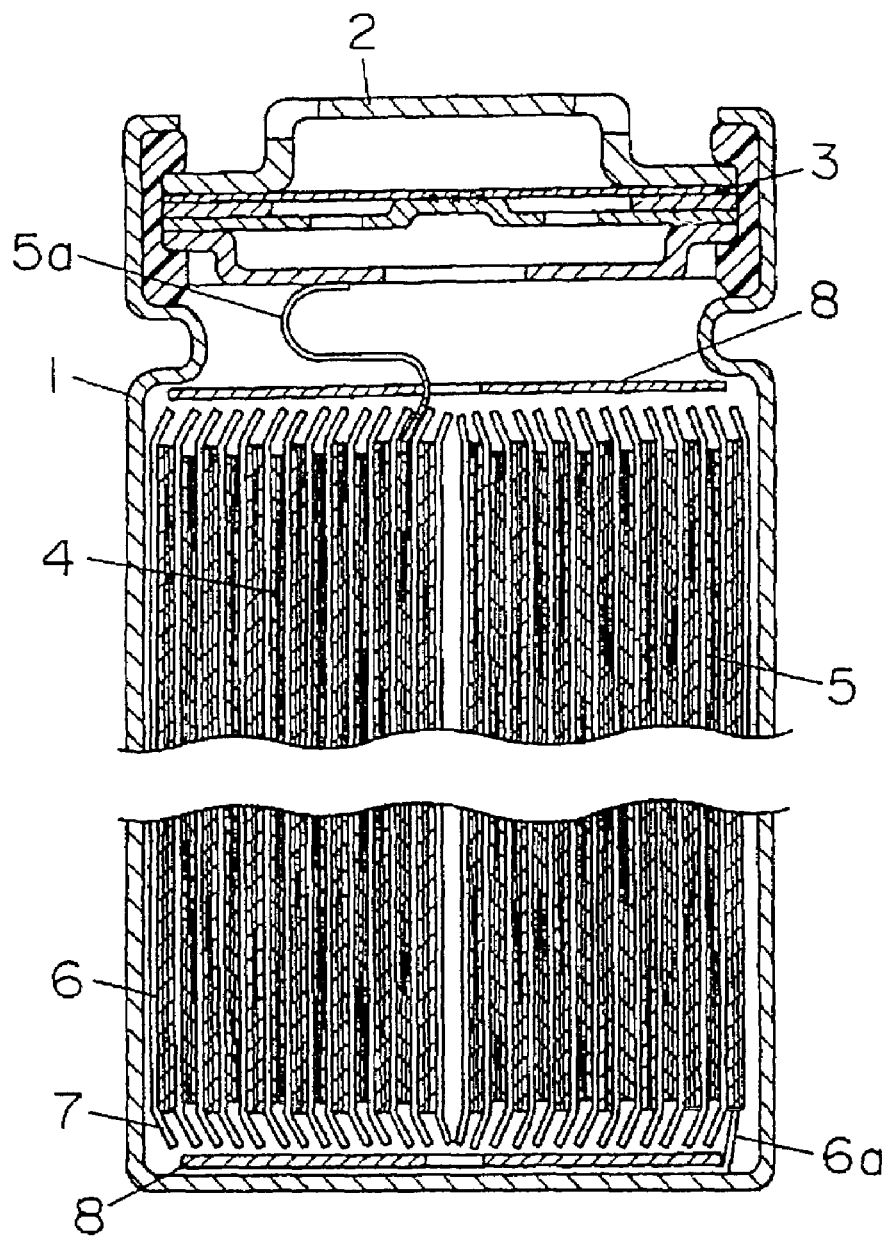
FIG. 1 is a structural diagram of an embodiment of a nonaqueous electrolyte secondary battery according to the invention.

FIG. 1 shows a cylindrical nonaqueous lithium secondary battery using an iron compound in the positive electrode active material according to the invention. In this diagram, reference numeral 1 is a battery case, 2 is a sealing plate, 3 is an insulating packing, 4 is a plate group, 5 is a positive electrode plate, 5a is a positive electrode lead, 6 is a negative electrode plate, 6a is a negative electrode lead, 7 is a separator, and 8 is an insulating ring. The nonaqueous electrolyte solution is absorbed in the separator and plate group, and is not shown in the diagram.

In the invention, the positive electrode plate 5 comprises an iron compound which is a positive electrode active material with particle size of 1 to 300 nm or less, being composed of primary particles substantially made of pore-free matter, and a compound layer including conductive agent and binding agent, which are applied on a current collector. The positive electrode lead 5a is welded to the electrode plate.

On the other hand, the negative electrode plate comprises graphite used as negative electrode material capable of inserting and releasing lithium ions electrochemically and reversibly, and a compound layer including conductive agent and binding agent, and the compound layer is applied to the surface of the current collector. The negative electrode lead 6a is welded to the electrode plate.

A separator 7 is interposed between the positive electrode plate 5 and negative electrode plate 6, and their leads project and wind around, and a vortex plate group 4 is composed. This plate group is accommodated in a cylindrical battery case 1. An insulating ring 8 is disposed above the plate group 4. A terminal 6a of the negative electrode plate is connected to the bottom of the battery case 1, and a sealing plate 2 serving also as external terminal and a positive electrode terminal 5a are connected in the upper part of the battery case 1. In the opening in the upper part of the battery case 1, the sealing plate 2 and an insulating packing 3 are disposed, and the opening is sealed by crimping.

The iron compound used as the positive electrode is composed of primary particles of which surface is a pore-free matter, and the entire structure is fabricated in a powder state composed of particles of 1 nm to 300 nm or less. The form of the primary particles is preferred to be spherical. In the invention, in principle, as far as the primary particles are pore-free matter, such porosity of secondary particles as to form by gathering of plural primary particles does not impede the characteristic. However, due caution is needed to avoid extreme aggregation of particles or porous structure of primary particles in the manufacturing process from materials to electrodes.

Powder of nano particles of such properties can be manufactured by synthesizing means of various iron compounds and fine particle manufacturing method, such as arc plasma sputtering method, developed recently.

Synthesizing methods include citric acid spray-dry method, spray pyrolysis method, and wet process ion exchange reaction method. Fine particle manufacturing methods include, aside from the arc plasma sputtering method, resistance heating method of mixing synthesized iron compound and carbon, and heating as anode of bar-shaped DC arc, powder evaporation method of supplying powder of proper particle size into plasma to evaporate completely, and quenching and solidifying outside of the plasma, and laser beam heating method of focusing carbon dioxide laser of high energy density continuously on a sample through a Ge window, and evaporating. By such physical methods, nano particles in various particle size ranges can be obtained by control of conditions. In particular, for fabrication of primary particles of pore-free matter, such method of applying high energy to iron compound is effective.

In the obtained active material particles ranging from 1 to 300 nm, both primary particles and secondary particles are present. Whether the positive electrode active material made of iron compound brings about the effects of the invention or not depends on the substantially pore-free composition of primary particles and the particle size range of 1 to 300 nm or less, and more preferably the specific surface area of the entire powder should be 100 $m^2/g$ or less. In particular, the range of 1 to 300 nm is the criterion for nano particles in the specified range and is the index for distinguishing the pore-free primary particles from porous powder.

The effects of the invention are obtained from the iron oxide, phosphorus oxide, chlorinated compound, and iron composite compound containing lithium made from them as expressed in the chemical formulas $Li_xFeO_y$ (0<x 1.5, 1.8<y<2.2), $LiFePO_4$, and $LiFeCl_4$. Above all, $Li_xFeO_y$ (0<x 1.5, 1.8<y<2.2) is a preferred material because the compound itself is stable, and an excellent battery life characteristic is obtained.

Materials for the negative electrode include, on the other hand, graphite and other carbon materials, lithium metal, lithium alloy, material having a metal element for forming an alloy with lithium, transition metal oxide, transition metal sulfide, and transition metal nitride.

The separator plays the role of preventing short-circuit, holding electrolyte solution, and permeating ions, and is required to be insoluble and stable in the electrolyte solution. Therefore, preferred materials for the separator include polyethylene, polypropylene, other polyolefin, fluorine resin, other micro-pore porous material, and nonwoven material. The safety of the battery is further enhanced by using also glass, metal oxide film, and other flame retardant material or noncombustible material.

The nonaqueous electrolyte includes a form of organic electrolyte solution having an electrolyte dissolved in non-aqueous organic solvent, a non-fluidized form of mixing such solution and polymer or other gelling agent, and a plain form of electrolyte without using solvent.

Examples of electrolyte include $LiClO_4$, $LiBF_4$, $LiPF_6$, $LiAlCl_4$, $LiSbF_6$, $LiSCN$, $LiCl$, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lower aliphatic lithium carbonate, $LiCl$, $LiBr$, $LiI$, chloroborane lithium, tetraphenyl lithium borate, and imides, and these materials can be used either alone or in combination of two or more types in the electrolyte solution.

The nonaqueous solvent includes ethylene carbonate (EC), propylene carbonate (PC), butylene carbonate (BC), vinylene carbonate (VC), other cyclic carbonates, dimethyl carbonate (DMC), diethyl carbonate (DEC), ethyl methyl carbonate (EMC), dipropyl carbonate (DPC), other chain carbonates, methyl formate, methyl acetate, methyl propionate, ethyl propionate, other aliphatic ester carbonates, γ-butyrolactone, other γ-lactones, 1,2-dimethoxy ethane (DME), 1,2-diethoxy ethane (DEE), ethoxy methoxy ethane (EME), other chain ethers, tetrahydrofuran, 2-methyl tetrahydrofuran, other cyclic ethers, dimethyl sulfoxide, 1,3-dioxolane, formamide, acetamide, dimethyl formamide, dioxolane, acetonitrile, propyl nitrite, nitromethane, ethyl monoglyme, triester phosphate, trimethoxy methane, dioxolane derivative, sulfolane, methyl sulfolane, 1,3-dimethyl-2-imidazolidinone, 3-methyl-2-oxazolidinone, propylene carbonate derivative, tetrahydrofuran derivative, ethyl ether, 1,3-propane saltone, annisole, dimethyl sulfoxide, N-methyl pyrrolidone, and other non-protonic organic solvents, and these can be used either alone or in combination of two or more types. Above all, mixture of cyclic carbonate and chain carbonate, or mixture of cyclic carbonate, chain carbonate and aliphatic ester carbonate is preferred.

The dissolving amount of electrolyte in the nonaqueous solvent is not particularly specified, but is preferred to be in a range of 0.2 to 2 mol/L. More preferably, it is in a range of 0.5 to 1.5 mol/L. Aside from the liquid, the following solid electrolyte may be also used. The solid electrolyte is classified into inorganic solid electrolyte and organic solid electrolyte. As the inorganic solid electrolyte, for example, nitride of Li, halide, and oxygen acid salt are known. In particular, $Li_4SiO_4$, $Li_4SiO_4$—$LiI$—$LiOH$, $xLi_3PO_4$—(1-x)$Li_4SiO_4$, $Li_2SiS_3$, $Li_3PO_4$—$Li_2S$—$SiS_2$, and phosphorus sulfide compound are effective. Effective materials for organic solid electrolyte include polyethylene oxide, polypropylene oxide, polyphosphazene, polyaziridine, polyethylene sulfide, polyvinyl alcohol, polyvinylidene fluoride, polyhexafluoropropylene, and their derivatives, mixtures, composite compounds, and polymer materials. The polymer material can be used by adding to the liquid electrolyte to be gelled and solidified.

Further, to enhance the discharging or charging and discharging characteristic, it is also effective to add other compound to the electrolyte. For example, triethyl phosphite, triethanol amine, cyclic ether, ethylene diamine, n-glyme, pyridine, hexatriamide phosphate, nitrobenzene derivative, crown ethers, quaternary ammonium salt, ethylene glycol dialkyl ether, and others may be added.

The invention is more specifically described below by referring to preferred embodiments.

Embodiment 1

To clarify the characteristic of the nonaqueous electrolyte battery using nano particles of iron compound in the properties shown in the invention, the iron compound was prepared by using $LiFeO_2$ of nano particles in particle size range of 1 to 300 nm or less, composed of primary particles of pore-free matter in various particle size ranges, and it was used in the active material of the positive electrode, and the nonaqueous electrolyte battery was fabricated.

The iron oxide was synthesized by the technique confirmed to form a layer structure by H. Fuchs et al. (Solid State Ionics, 68, 1994, p. 279). Nano particles were prepared by the arc plasma sputtering method.

Starting materials, $Na_2O_2$ and $\gamma$-$Fe_2O_3$, were heated for 12 hours at 350° C., and $\alpha$-$NaFeO_2$ was synthesized. The obtained $\alpha$-$NaFeO_2$ was put in LiCl/KCl dissolved salt at 400° C. to undergo ion exchange for 1 hour, and $LiFeO_2$ was synthesized. At this stage, the particles were large and the iron compound was inert, and lithium occluding and releasing reaction did not take place. The obtained compound was pulverized to nano particles by the arc plasma sputtering method.

The arc sputtering apparatus is a particle pulverizing apparatus comprising a water-cooled crucible serving also as the cathode, a hollow cylindrical stainless steel anode having a water cooling pipe wound on the outer side, and an ultrafine particle collector disposed thereon. The synthesized iron oxide was put into the crucible, and the entire reaction vessel was evacuated to a high vacuum, and He was supplied to strike an arc, then the vapor produced from the cathode sample surface was mixed with He plasma, and passed through the anode hole to get into the fine powder collector, and ultrafine particles were collected. The grain size of particles can be varied by controlling the arc power.

The particle size of thus obtained powder was measured by scanning electron microscope, and was classified, and samples of nano particles were prepared in five particle size ranges, that is, 1 to 100 nm, 100 to 200 nm, 200 to 300 nm, 300 to 400 nm, and 400 to 500 nm. These samples are called A1, A2, A3, A4, and A5, respectively. Microscopic observations proved that these particles were composed of nearly spherical primary particles of pore-free matter.

In 85 wt. % of each sample, 10 wt. % of carbon powder was added as conductive agent, and 5 wt. % of polyvinylidene fluoride resin as binding agent, and the mixture was dispersed in dehydrated N-methyl pyrrolidinone to prepare a slurry mixture, and this mixture was applied on the positive electrode current collector of aluminum foil, and dried and rolled, and cut to a specified size, and a positive electrode plate was prepared.

A negative electrode plate 6 was prepared by mixing carbon powder, and styrene butadiene rubber binder at a rate of 100:5 by weight, applying this mixture on both sides of the negative electrode current collector of copper foil, drying, rolling, and cutting to a specified size.

Using the obtained positive electrode and negative electrode, and a separator 7 made of polyethylene micro-porous film, an organic electrolyte solution was prepared by dissolving 1.5 mol/L of $LiPF_6$ in a mixed solvent of ethylene carbonate and ethyl methyl carbonate at 1:1 by volume, and a cylindrical nonaqueous electrolyte secondary battery of 18 mm in diameter and 65 mm in height was fabricated as shown in FIG. 1.

As a comparative example of the positive electrode active material of the invention, $LiFeO_2$ of particle size of 500 to 1000 nm exceeding the range of the invention was prepared. This $LiFeO_2$ was made from $Li_2CO_3$ and $Fe_2CO_3$, and synthesized by mixing them at specified molar ratio, and baking in the air for 20 hours at 850° C. The obtained $LiFeO_2$ was ground in a mortar for 8 hours. This sample is A6.

This powder sample was measured by scanning electron microscope, and the particle size ranged from 500 to 1000 nm, and most particles were porous matter with sharp undulations characteristic of coarse particles.

The obtained $LiFeO_2$ was used as the positive electrode active material, and a nonaqueous electrolyte battery was prepared in the same procedure as in embodiment 1.

The obtained batteries were first charged to 4.2 V at a constant current of 100 mA in the atmosphere of 20° C., and then discharged to 2.0 V at a constant current of 100 mA. Similar charging and discharging were repeated for several cycles until the battery capacity was almost constant, and the discharge capacity was measured.

TABLE 1

| Sample | Particle size range nm | Capacity per unit weight mAh/g |
|---|---|---|
| A1 | 1~100 | 140 |
| A2 | 100~200 | 134 |
| A3 | 200~300 | 120 |
| A4 | 300~400 | 91 |
| A5 | 400~500 | 84 |
| A6 | 500~1000 | 25 |

As clear from Table 1, in samples A1 to A3 in the nano particle size range of 1 to 300 nm, a high capacity per unit weight exceeding 120 mAh/g was obtained. By contrast, in the active material in a particle size range exceeding 300 nm, all results were smaller than 100 mAh/g. Besides, the value was extremely low in the active material exceeding 500 nm pulverized by grinding.

In other words, in the case of using iron compound as the active material for the positive electrode, when particles are pulverized in nm region, effects not found in the conventional micron region are obtained, such as effective adsorbing and desorbing reaction of lithium ions, but when the particle size exceeds 300 nm, it seems certain factors are generated to impede the nano effects.

Embodiment 2

Samples A1 to A5 prepared in embodiment 1 and comparative example A6 were set newly as B1, B2, B3, B4, B5, and B6. To prepare a comparative sample for this embodiment, different from A6, using cobalt carbonate and lithium citrate dissolved in 1,2-propylene glycol aqueous solution as the starting material, $LiFeO_2$ was synthesized in the process comprising a step of mixing them at a specified molar ratio, a step of condensation-polymerization reaction by adding citric acid in excess and heating to 100° C., a drying step, a heating step of heating gradually in the air up to 800° C., and a baking step. The synthesized matter was finely ground in a mortar. This sample is B6.

The specific surface area of $LiFeO_2$ was measured by BET method, and the specific surface area was 115 $m^2/g$, and porous powder was confirmed by electron scanning microscope. The particle size was in a range of 100 to 200 nm.

In these samples, the specific surface area was measured by the BET method, and the relation between the obtained specific surface area and the discharge capacity per unit weight obtained in embodiment 1 was investigated. The results are summarized in Table 2.

TABLE 2

| Sample | Particle size range nm | Specific surface area $m^2/g$ | Discharge capacity per unit weight mAh/g |
|---|---|---|---|
| B1 | 1~100 | 52.2 | 140 |
| B2 | 100~200 | 23.7 | 134 |
| B3 | 200~300 | 14.5 | 120 |
| B4 | 300~400 | 12.1 | 91 |
| B5 | 400~500 | 9.5 | 84 |
| B6 | 100~200 | 115.0 | 54 |

As shown in Table 2, in the nano particle region, as the particle size becomes smaller, the specific surface area tends to increase, but as the surface area increases, the discharge capacity per unit weight tends to increase. Even in the nano particle region, so far as not exceeding 300 nm, it seems that the composite effects of nano effect and specific surface area are obtained synergistically.

However, the active material of B6 was accompanied by decomposition of electrolyte, and lacked in stability, and the capacity per unit weight was low. This result suggests that the specific surface area exceeding 100 $m^2/g$ is not preferred in the aspect of applying iron compound in the active material for positive electrode.

Further, comparison between B1 and B6 shows that it is necessary to suppress the specific surface area even if the particles are small enough to obtain nano effects, and it seems that suppression of surface area is achieved by the pore-free structure of primary particles.

Embodiment 3

To show how the nano effects are changed by the manufacturing method of LiFeO$_2$, iron compounds were prepared in three different methods, that is, citric acid spray-dry method, spray pyrolysis method, and wet process ion exchange reaction method, and pulverized to nano size by arc plasma sputtering method, and the properties of the obtained nano particles and battery characteristics were investigated. The samples obtained by these methods are C1, C2 and C3, respectively.

C1: Citric acid spray-dry method

A nitric acid solution of Li and Fe, and a citric acid aqueous solution were mixed, and sprayed together with compressed air heated to 200° C. by using two-fluid nozzle, and particles of iron compound are synthesized.

C2: Spray pyrolysis method

A nitrate aqueous solution of Li and Fe, and a citric acid aqueous solution were mixed, and sprayed together with compressed air heated to 200° C. by using two-fluid nozzle, and particles of LiFeO$_2$ are synthesized.

C3: Wet process ion exchange reaction method

Mixing γ-oxy iron hydroxide, and lithium hydroxide in a crucible, the crucible is heated to 130° C. in an autoclave reaction vessel filled with water, and ion exchange reaction is performed for 10 hours, and nano particles of LiFeO$_2$ are obtained.

The powder of the compound was pulverized to specified particle size by the arc plasma sputtering method same as in embodiment 1.

The particle shape and particle size of the samples C1, C2 and C3 were observed by scanning microscope, and the specific surface area was measured by the BET method. Using these samples as the positive electrode, batteries were fabricated, and the discharge capacity per 1 g of positive electrode active material was investigated. The particle size, specific surface area, and capacity per unit weight are summarized in Table 3.

TABLE 3

| Sample | Particle size range nm | Specific surface area $m^2/g$ | Capacity per unit weight mAh/g |
|---|---|---|---|
| C1 | 1~300 | 52.2 | 110 |
| C2 | 1~300 | 11.4 | 112 |
| C3 | 1~300 | 21.9 | 103 |

As shown in Table 3, all samples were within the particle size range of 1 to 300 nm. The specific surface area varied, but was controlled under 100 $m^2/g$, and the capacity per unit weight was over 100 mAh/g. As a result of observations by scanning electron microscope, all particles were nearly spherical primary particles of pore-free matter.

These results suggest that the capacity per unit weight of active material is achieved by proper setting of the shape of primary particles for composing nano particles, proper particle size range, and specific surface area, regardless of the synthesizing method of iron compound.

Embodiment 4

To show how the effects of the invention are changed by the compounds, nano particles were prepared by other iron compounds LiFePO$_4$ and Li$_2$FeCl$_4$, aside from LiFeO$_2$, in the following methods. Using them, nonaqueous electrolyte batteries were prepared same as in embodiment 1, and tested same as in embodiment 1. Positive electrode active materials obtained from LiFePO$_4$ and Li$_2$FeCl$_4$ are respectively D1 and D2.

D1: LiFePO$_4$

Starting from Li$_3$PO$_4$.P$_2$O$_5$ and Fe(CH$_3$COO)$_2$, LiFePO$_4$ was prepared by mixing at specified molar ratio. The mixture was baked in an oven of argon atmosphere for 5 hours at 350° C., and was further baked for 6 hours at 800° C., and LiFePO$_4$ was synthesized. The synthesized LiFePO$_4$ was roughly ground, and prepared to nano size by the arc plasma sputtering method.

D2: Li$_2$FeCl$_4$

Starting from LiCl and FeCl$_2$, Li$_2$FeCl$_4$ was synthesized by mixing them at specified molar ratio, and baking in an oven of argon atmosphere for 7 days at 400° C. The obtained Li$_2$FeCl$_4$ was roughly ground, and prepared to nano size by the arc plasma sputtering method.

The particle size, specific surface area, and discharge capacity per 1 g of positive electrode active material of the obtained D1 and D2 are summarized in Table 4.

TABLE 4

| Sample | Particle size range nm | Specific surface area $m^2/g$ | Capacity per unit weight mAh/g |
|---|---|---|---|
| D1 | 1~300 | 77.5 | 110 |
| D2 | 1~300 | 32.5 | 112 |

As shown in Table 4, both samples D1 and D2 were within the range of 1 to 300 nm, and the specific surface area was controlled under 100 m²/g. On the other hand, the batteries were discharged in a range from 4.2 to 2 V, and the capacity obtained in this period was stabilized after several cycles of charging and discharging. As calculated from the weight of the active material being used and the discharge capacity, the capacity per unit weight was over 100 mAh/g.

As a result of observations of primary particles for composing the particles by scanning electron microscope, all particles were nearly spherical pore-free matter.

As known from these results, even by using other iron compounds than LiFeO₂, a large discharge capacity can be obtained by controlling the particles within the nano size of 1 to 300 nm, being composed of pore-free primary particles.

Thus, by using iron compound of nano particle size of 1 to 300 nm substantially made of pore-free primary particles as the active material for the positive electrode, and more preferably by controlling the specific surface area under 100 m²/g, a nonaqueous electrolyte of excellent capacity characteristic and excellent stability can be prepared. As a result, regardless of the type of the iron compound, a nonaqueous electrolyte battery giving certain effects to the active material and excellent in charging and discharging cycle characteristic can be obtained.

The effects of the invention are not limited to the illustrated embodiments alone, as far as the positive electrode active material is made of iron compound of nano particle size of 1 to 300 nm substantially made of pore-free primary particles.

What is claimed is:

1. A material useful as a positive electrode active material, said material comprising pore free primary particles of an iron compound, wherein the primary particles are 1 to 300 nm, and wherein the iron compound comprises lithium.

2. The material of claim 1, wherein the iron compound is selected from the group consisting of iron oxides, iron phosphorus oxides, iron halides, and mixtures thereof.

3. The material of claim 2, wherein the specific surface area of the particles of the iron compound is 100 m²/g or less.

4. The material of claim 3, wherein the iron compound is $Li_xFeO_y$, wherein $0<x\leq1.5$, and $1.8<y<2.2$.

5. The material of claim 1, wherein the specific surface area of the particles of the iron compound is 100 m²/g or less.

6. The material of claim 5, wherein the iron compound is $Li_xFeO_y$, wherein $0<x\leq1.5$, and $1.8<y<2.2$.

7. The material of claim 6, wherein the particles are spherical.

8. The material of claim 1, wherein the iron compound is selected from the group consisting of lithium iron oxides, lithium iron phosphorus oxides, lithium iron halides, and mixtures thereof.

9. The material of claim 8, wherein the specific surface area of the particles of the iron compound is 100 m²/g or less.

10. The material of claim 9, wherein the particles are spherical.

11. The material of claim 1, wherein the iron compound is $Li_xFeO_y$, wherein $0<x\leq1.5$, and $1.8<y<2.2$.

12. The material of claim 1, wherein the particles are spherical.

13. A material useful in as a positive electrode active material, said material comprising pore free primary particles of 300 nm or less of an iron compound, wherein the iron compound is $Li_xFeO_y$, wherein $0<x\leq1.5$, and $1.8<y<2.2$.

14. The material of claim 13, wherein the particles are spherical.

15. A material useful in as a positive electrode active material, said material comprising pore free primary particles of an iron compound, wherein the primary particles are 1 to 300 nm, and wherein the iron compound is $LiFePO_4$ or $LiFeCl_4$.

16. The material of claim 15, wherein the specific surface area of the particles of the iron compound is 100 m²/g or less.

17. The material of claim 16, wherein the particles are spherical.

* * * * *

UNITED STATES PATENT AND TRADEMARK OFFICE
CERTIFICATE OF CORRECTION

PATENT NO.        : 7,378,192 B2  
APPLICATION NO.   : 10/194032  
DATED             : May 27, 2008  
INVENTOR(S)       : Hiroshi Yoshizawa et al.

Page 1 of 1

It is certified that error appears in the above-identified patent and that said Letters Patent is hereby corrected as shown below:

At Column 10, line 34, "LifeO$_2$." should read -- LiFeO$_2$ --

Signed and Sealed this

Fourth Day of November, 2008

JON W. DUDAS  
*Director of the United States Patent and Trademark Office*